United States Patent
Wu et al.

(10) Patent No.: US 9,742,215 B2
(45) Date of Patent: Aug. 22, 2017

(54) INPUT DEVICE

(71) Applicant: Primax Electronics Ltd., Neihu, Taipei (TW)

(72) Inventors: Tung-Heng Wu, Taipei (TW); Ying-Che Tseng, Taipei (TW)

(73) Assignee: PRIMAX ELECTRONICS LTD., Neihu, Taipei (TW)

(*) Notice: Subject to any disclaimer, the term of this patent is extended or adjusted under 35 U.S.C. 154(b) by 46 days.

(21) Appl. No.: 14/946,430

(22) Filed: Nov. 19, 2015

(65) Prior Publication Data
US 2016/0252993 A1    Sep. 1, 2016

(30) Foreign Application Priority Data
Feb. 26, 2015    (TW) .............................. 104106184 A

(51) Int. Cl.
| | |
|---|---|
| G06F 3/042 | (2006.01) |
| H02J 7/02 | (2016.01) |
| H02J 7/35 | (2006.01) |
| H02J 50/00 | (2016.01) |
| H02J 7/00 | (2006.01) |

(52) U.S. Cl.
CPC ................ H02J 7/025 (2013.01); H02J 7/35 (2013.01); H02J 50/00 (2016.02); *H02J 2007/0096* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,608,385 A | * | 3/1997 | Masaki | .................. H02S 50/10 320/101 |
| 9,461,341 B2 | * | 10/2016 | Momo | .................. H01M 10/46 |
| 2014/0176076 A1 | * | 6/2014 | Momo | .................. H01M 10/46 320/128 |

* cited by examiner

*Primary Examiner* — Van Chow
(74) *Attorney, Agent, or Firm* — Kirton McConkie; Evan R. Witt

(57) ABSTRACT

An input device includes an input interface, a power module, a wireless charging module, a solar charging module and a controller. The power module provides electricity to the input device. The wireless charging module is used for wirelessly charging an electronic device. The solar charging module is used for charging the power module or providing electricity to the wireless charging module. When the controller detects that an electricity quantity percentage of the power module is lower than a predetermined value, the controller controls the solar charging module to charge the power module. When the electronic device is in communication with the input device, the controller controls the solar charging module to the provide electricity to the wireless charging module, and the electronic device is wirelessly charged by the wireless charging module if the electronic device is within a charging range.

10 Claims, 4 Drawing Sheets

INPUT DEVICE

FIELD OF THE INVENTION

The present invention relates to an input device, and more particularly to an input device with a solar charging module.

BACKGROUND OF THE INVENTION

With increasing development of science and technology, the trends of designing electronic devices are toward small size and light weightiness. For example, various portable electronic devices such as portable electronic devices or tablet computers have small volume and light weightiness. Consequently, the portable electronic devices can be easily carried by users.

Generally, these portable electronic devices can support various application programs to provide diversified functions. However, due to the limitation of the size of the display screen, the user may erroneously touch the display screen. Consequently, the typing task may be performed with difficulty. For solving this drawback, a large number of wireless input devices matching these portable electronic devices have been introduced into the market. For example, a wireless Bluetooth keyboard is one kind of wireless input device.

However, the commercially available wireless input devices only have the function of inputting characters, and are unable to be used as other devices. Moreover, by reducing the areas of the keys or the number of keys, the wireless input devices have reduced volume in order to be carried by the users. However, since the areas of the keys or the number of keys are reduced, these wireless input devices are not user-friendly.

Therefore, there is a need of providing an improved wireless input device in order to overcome the above drawbacks.

SUMMARY OF THE INVENTION

The present invention provides a wireless input device that has various functions and is easily carried and operated.

In accordance with an aspect of the present invention, there is provided an input device. The input device includes at least one input interface, a power module, a wireless charging module, a solar charging module, and a controller. When the at least one input interface is touched, a corresponding input signal is generated. The power module provides electricity to the input device. The wireless charging module is used for wirelessly charging an electronic device. The solar charging module is used for charging the power module or providing electricity to the wireless charging module. The controller is disposed on a circuit board and electrically connected with the input interface, the power module, the wireless charging module and the solar charging module. When the controller detects that an electricity quantity percentage of the power module is lower than a predetermined value, the controller controls the solar charging module to charge the power module. When the electronic device is in communication with the input device, the controller controls the solar charging module to the provide electricity to the wireless charging module. In addition, the electronic device is wirelessly charged by the wireless charging module if the electronic device is within a charging range.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
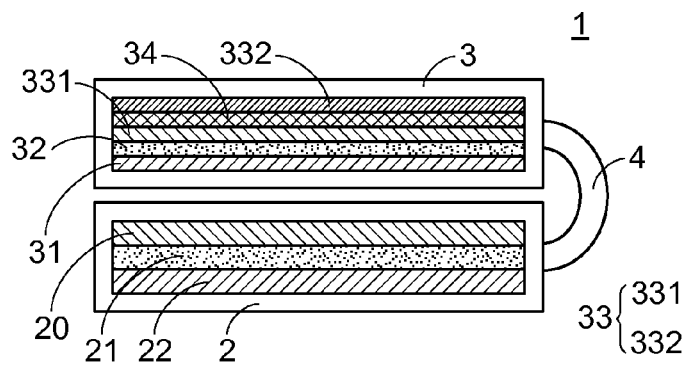
FIG. 1 schematically illustrates the structure of an input device according to an embodiment of the present invention.
Figure 2:
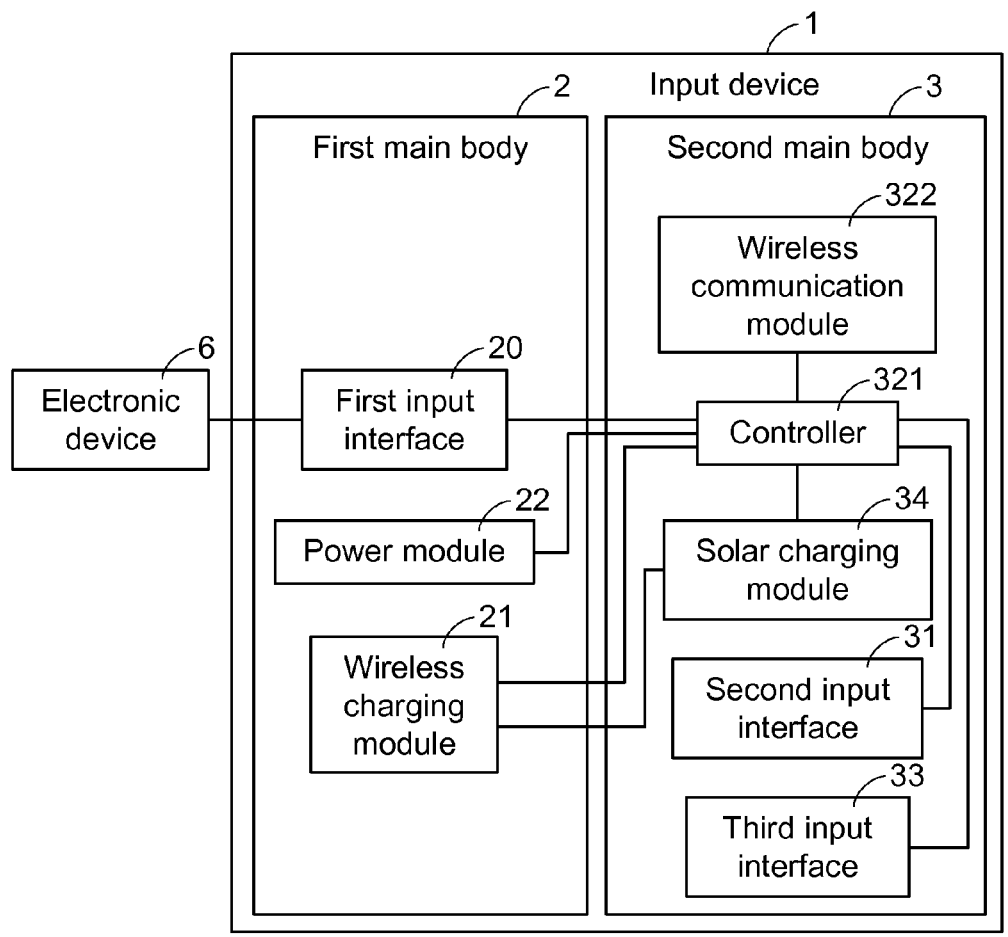
FIG. 2 is a schematic functional block diagram illustrating the input device according to the embodiment of the present invention.

FIG. 1 schematically illustrates the structure of an input device according to an embodiment of the present invention. FIG. 2 is a schematic functional block diagram illustrating the input device according to the embodiment of the present invention. As shown in FIGS. 1 and 2, the input device 1 comprises a first main body 2 and a second main body 3. The first main body 2 is pivotally coupled to the second main body 3 through a connecting structure 4. Consequently, the first main body 2 and the second main body 3 are rotatable relative to each other.

The first main body 2 comprises a first input interface 20, a wireless charging module 21 and a power module 22. The wireless charging module 21 and the power module 22 are disposed under the first input interface 20. The second main body 3 comprises a second input interface 31, a circuit board 32, a third input interface 33 and a solar charging module 34. The third input interface 33 and the solar charging module 34 are disposed over the second input interface 31. The circuit board 32 is arranged between the second input interface 31 and the third input interface 33. The third input interface 33 comprises a display layer 331 and a touch layer 332. The touch layer 332 is disposed over the display layer 331. The solar charging module 34 is arranged between the display layer 331 and the touch layer 332.

In this embodiment, the power module 22 is a battery. Preferably but not exclusively, the first input interface 20, the second input interface 31 and the third input interface 33 are organic light emitting diode (OLED) touch panels, the display layer 331 is an organic light emitting diode layer, and the touch layer 332 is a capacitive touch layer. The locations of the power module 22 and the circuit board 32 can be exchanged between each other or combined with each other. That is, the locations of the power module 22 and the circuit board 32 are not restricted to those as shown in FIG. 1.

Moreover, a controller 321 and a wireless communication module 322 are disposed on the circuit board 32. The controller 321 is electrically connected with the first input interface 20, the second input interface 31, the third input interface 33, the power module 22, the wireless charging module 21 and the solar charging module 34. The power module 22 is used for providing electricity to the first input interface 20, the second input interface 31, the third input interface 33, the circuit board 32 and the solar charging module 34. The solar charging module 34 is used for charging the power module 22 or providing electricity to the wireless charging module 21. The wireless charging module 21 is used for wirelessly charging an electronic device 6 that is in communication with the input device 1 through the wireless communication module 322.

When the controller 321 detects that the electricity quantity percentage of the power module 222 is lower than a predetermined value (e.g., 30%), the controller 321 notifies the solar charging module 34 to provide electricity to charge the power module 22. Consequently, the electricity quantity of the power module 222 is not exhausted.

For achieving a power-saving purpose, the power module 22 does not provide electricity to the wireless charging module 21, and the solar charging module 34 does not provide electricity to the wireless charging module 21 at any time. When the electronic device 6 is in communication with the input device 1 through the wireless communication module 322, the controller 321 notifies the solar charging module 34 to provide electricity to the wireless charging module 21. Consequently, if the electronic device 6 is in a charging range of the wireless charging module 21, the electronic device 6 is wirelessly charged by the wireless charging module 21.

Figure 3:
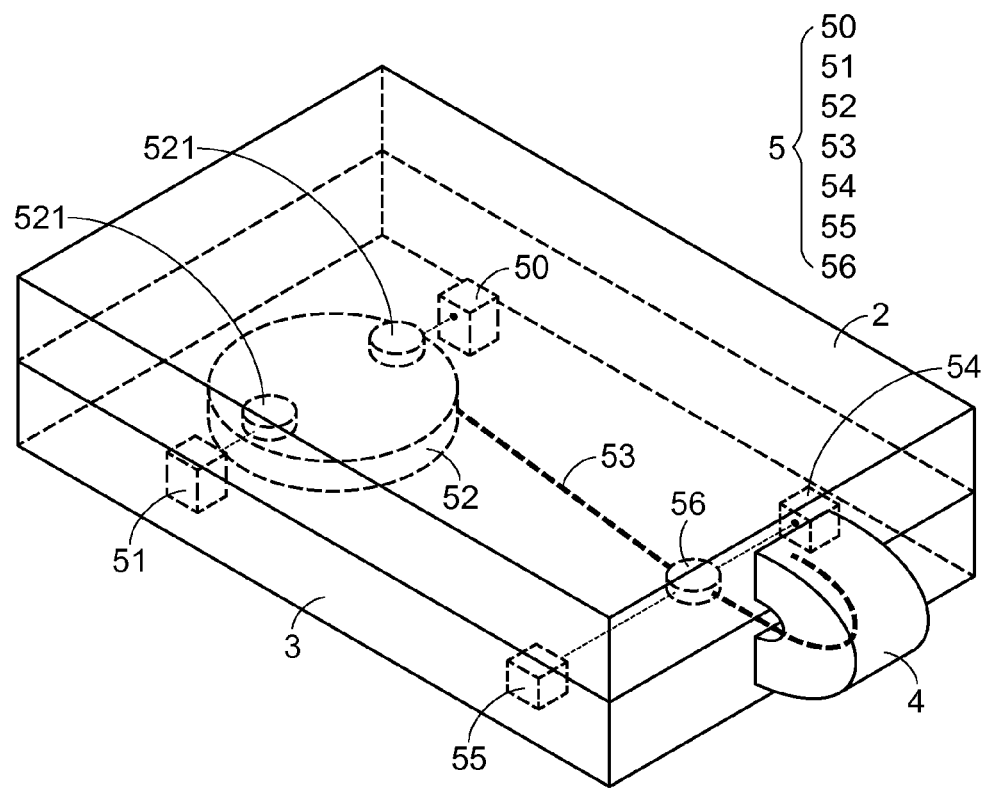
FIG. 3 schematically illustrates an operation mode detecting mechanism of the input device according to the embodiment of the present invention.

Please refer to FIGS. 1 and 3. FIG. 3 schematically illustrates an operation mode detecting mechanism of the input device according to the embodiment of the present invention. In case that the first main body 2 and the second main body 3 are not rotated relative to each other, the first main body 2 and the second main body 3 are arranged in a stack form. That is, the first main body 2 and the second main body 3 are stacked on each other. Moreover, the first input interface 20 is in contact with the second input interface 31. Meanwhile, the input device 1 is in an initial mode. In case that the first main body 2 and the second main body 3 are rotated relative to each other, the controller 321 determines the operation mode of the input device 1 according to the relative rotating angle between the first main body 2 and the second main body 3. The operating principles will be illustrated in more details as follows.

As shown in FIG. 3, the input device 1 further comprises an operation mode detecting mechanism 5. The operation mode detecting mechanism 5 comprises a first optical emitter 50, a first optical sensor 51, a rotary structure 52, a connecting wire 53, a second optical emitter 54, a second optical sensor 55 and a blocking element 56. The first optical emitter 50, the first optical sensor 51, the second optical emitter 54 and the second optical sensor 55 are disposed on the circuit board 32. The rotary structure 52 is arranged between the first optical emitter 50 and the first optical sensor 51. The connecting wire 53 is wound around the rotary structure 52 and connected with the first main body 2. Under this circumstance, the connecting wire 53 is in a tightened status. However, in case that the circuit board 32 and the rotary structure 52 are disposed within the first main body 2, the connecting wire 53 is wound around the rotary structure 52 and connected with the second main body 3.

The blocking element 56 is fixed on the connecting wire 53. If the blocking element 56 is arranged between the second optical emitter 54 and the second optical sensor 55, the light beam from the second optical emitter 54 is obstructed by the blocking element 56. Consequently, the light beam from the second optical emitter 54 cannot be received by the second optical sensor 55. Under this circumstance, the controller 321 judges that the input device 1 is in the initial mode. Moreover, the rotary structure 52 comprises two protrusion parts 521. When the input device 1 is in the initial mode, the light beam from the first optical emitter 50 is obstructed by one protrusion part 521, and thus the light beam from the first optical emitter 50 cannot be received by the first optical sensor 51. In this embodiment, whenever the rotary structure 52 is rotated by 90 degrees, the light beam from the first optical emitter 50 is obstructed by the other protrusion part 521.

Figure 4:
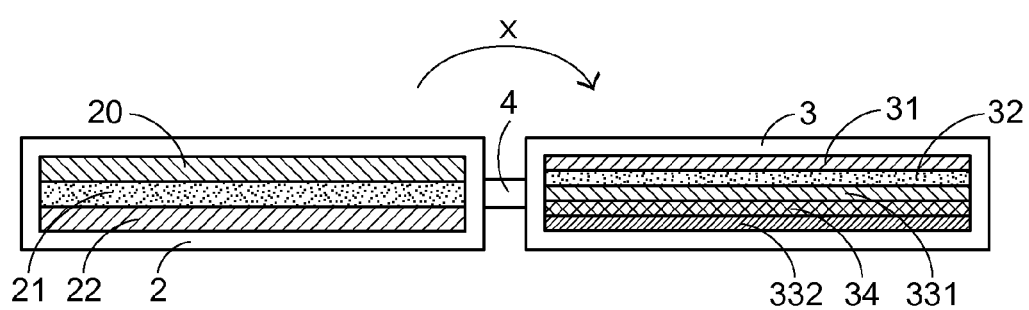
FIG. 4 schematically illustrates the input device of the present invention in a first operation mode.
Figure 5:
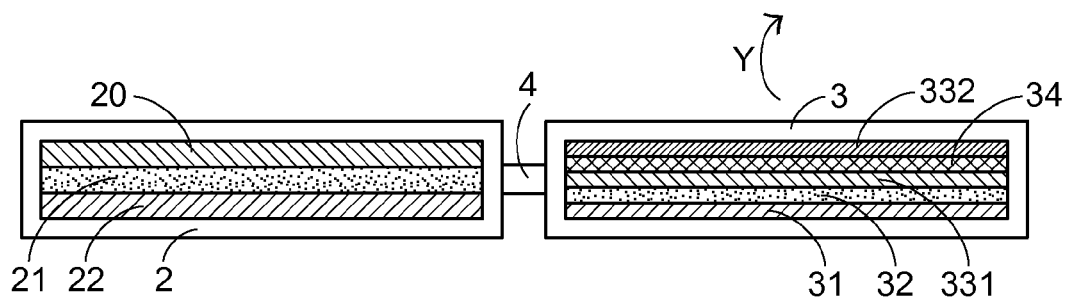
FIG. 5 schematically illustrates the input device of the present invention in a second operation mode.
Figure 6:
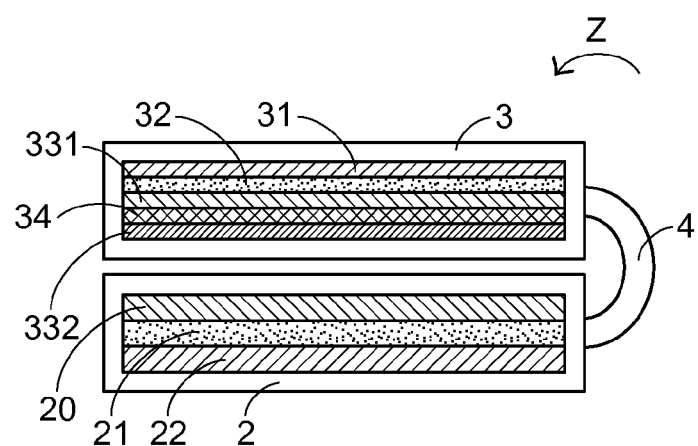
FIG. 6 schematically illustrates the input device of the present invention in a third operation mode.
Figure 7:
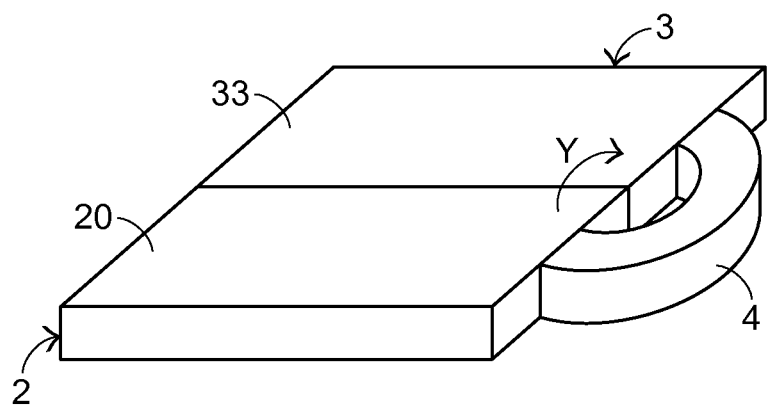
FIG. 7 schematically illustrates the input device of the present invention in a fourth operation mode.
Figure 8:
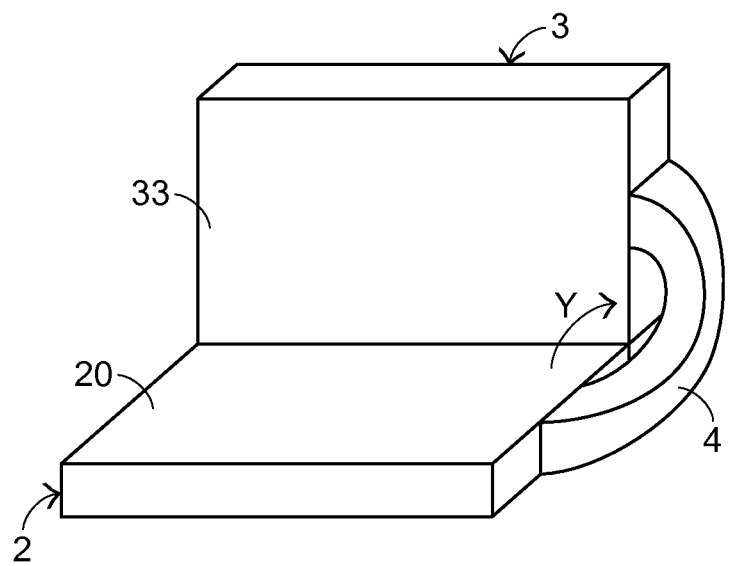
FIG. 8 schematically illustrates the input device of the present invention in a fifth operation mode.

Hereinafter, some operation modes of the input device 1 will be illustrated with reference to FIG. 1 and FIGS. 3~8. FIG. 4 schematically illustrates the input device of the present invention in a first operation mode. FIG. 5 schematically illustrates the input device of the present invention in a second operation mode. FIG. 6 schematically illustrates the input device of the present invention in a third operation mode. FIG. 7 schematically illustrates the input device of the present invention in a fourth operation mode. FIG. 8 schematically illustrates the input device of the present invention in a fifth operation mode.

Please refer to FIGS. 1, 3 and 4. When the second main body 3 is rotated relative to the first main body 2, the connecting wire 53 is pulled and thus the rotary structure 52 is rotated with the pulled connecting wire 53. When the second main body 3 in the status as shown FIG. 1 is rotated relative to the first main body 2 by 180 degrees along a first direction X and changed to the status as shown in FIG. 4, the rotary structure 52 is also rotated by 180 degrees. In other words, the light beam from the first optical emitter 50 is obstructed by one protrusion part 521 twice. Under this circumstance, the controller 321 judges that the input device 1 is switched to a first operation mode.

Please refer to FIG. 4. When the input device 1 is in the first operation mode, the first input interface 20 and the second input interface 31 are located at the top sides of the first main body 2 and the second main body 3, respectively. Moreover, the first input interface 20 and the second input interface 31 are substantially coplanar with each other. Under this circumstance, the first input interface 20 and the second input interface 31 are expanded to a large-sized display surface. In this embodiment, the first input interface 20 and the second input interface 31 are collaboratively formed as a complete standard keyboard image (i.e., a QWERTY keyboard image) in the first operation mode. Consequently, when the standard keyboard image is touched by the user, an input signal is generated to the electronic device 6 that is in communication with the input device 1. The operations of the input device 1 in the first operation mode are presented herein for purpose of illustration and description only.

Please refer to FIGS. 1, 3 and 5. In this situation, the second main body 3 in the status as shown FIG. 4 is rotated relative to the first main body 2 by 180 degrees along a second direction Y and changed to the status as shown in FIG. 5. Similarly, according to the number of times that the light beam from the first optical emitter 50 is obstructed by the protrusion part 521, the controller 321 judges that the operation mode of the input device 1 is switched from the first operation mode to the second operation mode. The operating principles of the input device 1 in the second operation mode are similar to those mentioned above, and are not redundantly described herein. When the input device 1 is in the second operation mode, the first input interface 20 and the third input interface 33 are located at the top sides of the first main body 2 and the second main body 3, respectively. Moreover, the first input interface 20 and the third input interface 33 are substantially coplanar with each other. Under this circumstance, the first input interface 20 and the third input interface 33 are expanded to a large-sized display surface. In this embodiment, the first input interface 20 and the third input interface 33 are collaboratively formed as a complete image of a remote controller. An example of the remote controller includes but is not limited to a TV remote controller or a presentation remote controller.

Please refer to FIGS. 6, 7 and 8. The input device in the third operation mode, the input device in the fourth operation mode and the input device in the fifth operation mode are shown in FIGS. 6, 7 and 8, respectively. When the second main body 3 in the status as shown FIG. 5 is rotated relative to the first main body 2 by 180 degrees along a third direction Z and changed to the status as shown in FIG. 6, the controller 321 judges that the input device 1 is switched to the third operation mode. Meanwhile, the first main body 2 and the second main body 3 are arranged in a stack form, and the first input interface 20 is in contact with the third input interface 33. Moreover, the second input interface 31 is exposed to the top side to be used as a touchpad. Via the second input interface 3, the controller 321 controls the movement of a cursor of the electronic device 6 that is in communication with the input device 1. The operations of the input device 1 in the second operation mode are presented herein for purpose of illustration and description only.

When the second main body 3 in the status as shown FIG. 6 is rotated relative to the first main body 2 by 180 degrees along the second direction Y and changed to the status as shown in FIG. 7, the controller 321 judges that the input device 1 is switched to the fourth operation mode. Meanwhile, the first input interface 20 and the third input interface 33 are located at the top sides of the first main body 2 and the second main body 3, respectively. Moreover, the first input interface 20 and the third input interface 33 are substantially coplanar with each other. Under this circumstance, the first input interface 20 and the third input interface 33 are expanded to a large-sized display surface. In this embodiment, the first input interface 20 and the third input interface 33 are collaboratively formed as an external display screen for the electronic device 6, which is in communication with the input device 1.

In the second operation mode and the fourth operation mode, the first input interface 20 and the third input interface 33 are located at the top sides of the first main body 2 and the second main body 3 and coplanar with each other. However, the arranging directions of the first main body 2 and the second main body 3 in the second operation mode and the fourth operation mode are different.

When the second main body 3 in the status as shown FIG. 6 is rotated relative to the first main body 2 by 90 degrees along the second direction Y and changed to the status as shown in FIG. 8, the controller 321 judges that the input device 1 is switched to the fifth operation mode. Meanwhile, the first input interface 20 and the third input interface 33 are perpendicular to each other. Under this circumstance, the input device 1 is used as a charging device. When the electronic device 6 in communication with the input device 1 is placed on the first main body 2 and the electronic device 6 is within a charging range of the wireless charging module 21, the electronic device 6 is wirelessly charged by the wireless charging module 21.

From the above descriptions, the present invention provides the input device 1. The input device 1 comprises the first main body 2 and the second main body 3. The first main body 2 and the second main body 3 are rotatable relative to each other. After the first main body 2 and the second main body 3 are folded to a compact size, the efficacy of carrying the input device 1 is enhanced. Moreover, after the first main body 2 and the second main body 3 are unfolded, a large-sized display surface of the input device 1 can facilitate the user to operate the input device 1.

Moreover, the input device 1 uses the operation mode detecting mechanism 5 to detect the relative rotating angle between the first main body 2 and the second main body 3. According to the relative rotating angle between the first main body 2 and the second main body 3, the controller 321 switches the operation mode of the input device 1. Consequently, the input device 1 has multiple functions.

Moreover, when the controller 321 detects that the electricity quantity percentage of the power module 222 is lower than the predetermined value, the controller 321 notifies the solar charging module 34 to charge the power module 22. Consequently, the use time of the input device 1 is increased.

Moreover, when the electronic device 6 is in communication with the input device 1 through the wireless communication module 322, the controller 321 notifies the solar charging module 34 to provide electricity to the wireless charging module 21. Consequently, the electronic device 6 can be wirelessly charged. In other words, the functions of the input device 1 are more diverse, the power consumption of the power module 22 is reduced, and the use time of the input device 1 is not shortened.

From the above descriptions, the present invention provides an input device. The input device has many functions and is easily carried and operated. Moreover, the ability of managing the electricity quantity is enhanced. In other words, the input device of the present invention can solve the drawbacks of the conventional technologies.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all modifications and similar structures.

What is claimed is:

1. An input device, comprising:
   at least one input interface, wherein when the at least one input interface is touched, a corresponding input signal is generated;
   a power module providing electricity to the input device;
   a wireless charging module for wirelessly charging an electronic device;
   a solar charging module for charging the power module or providing electricity to the wireless charging module;
   a controller disposed on a circuit board and electrically connected with the input interface, the power module, the wireless charging module and the solar charging module,
   wherein when the controller detects that an electricity quantity percentage of the power module is lower than a predetermined value, the controller controls the solar charging module to charge the power module, wherein when the electronic device is in communication with the input device, the controller controls the solar charging module to the provide electricity to the wireless charging module, and the electronic device is wirelessly charged by the wireless charging module if the electronic device is within a charging range; and a first main body and a second main body, wherein the at least one input interface comprises a first input interface and a second input interface, wherein the first input interface is disposed within the first main body, and the second input interface is disposed within the second main body, wherein the first main body is pivotally coupled to the second main body, so that the first main body and the second main body are rotatable relative to each other.

2. The input device according to claim 1, wherein the power module and the wireless charging module are disposed within the first main body, and the solar charging module and the circuit board are disposed within the second main body.

3. The input device according to claim 1, wherein the circuit board and the wireless charging module are disposed within the first main body, and the solar charging module and the power module are disposed within the second main body.

4. The input device according to claim 1, wherein the at least one input interface further comprises a third input interface, wherein the third input interface is disposed within the second main body, and the third input interface comprises a display layer and a touch layer, wherein the solar charging module is arranged between the display layer and the touch layer.

5. The input device according to claim 1, wherein after the second main body is rotated relative to the first main body, an operation mode of the input device is switched by the controller.

6. The input device according to claim 5, further comprising an operation mode detecting mechanism, wherein the operation mode detecting mechanism comprises:
a first optical emitter disposed on the circuit board;
a first optical sensor disposed on the circuit board, and receiving a light beam from the first optical emitter;
a rotary structure arranged between the first optical emitter and the first optical sensor, and comprising at least one protrusion part; and
a connecting wire connected with the rotary structure,
wherein when the second main body is rotated relative to the first main body, the connecting wire is pulled, and the rotary structure is rotated with the pulled connecting wire, wherein when the at least one protrusion part is moved to a region between the first optical emitter and the first optical sensor, the light beam is obstructed by the at least one protrusion part, wherein the operation mode of the input device is switched by the controller according to a number of times that the light beam is obstructed by the at least one protrusion part.

7. The input device according to claim 6, wherein the operation mode detecting mechanism further comprises:
a second optical emitter disposed on the circuit board;
a second optical sensor disposed on the circuit board, and receiving a light beam from the second optical emitter; and
a blocking element disposed on the connecting wire,
wherein when the first main body and the second main body are arranged in a stack form and the first input interface is in contact with the second input interface, the light beam from the second optical emitter is obstructed by the blocking element, and the controller judges that the input device is in an initial mode.

8. The input device according to claim 6, wherein the circuit board is disposed within the second main body, and the rotary structure is connected with the first main body through the connecting wire.

9. The input device according to claim 6, wherein the circuit board is disposed within the first main body, and the rotary structure is connected with the second main body through the connecting wire.

10. The input device according to claim 1, further comprising a wireless communication module, wherein the wireless communication module is disposed on the circuit board, and the electronic device is in communication with the input device through the wireless communication module.

* * * * *